(12) United States Patent
Iwazaki et al.

(10) Patent No.: US 11,695,902 B2
(45) Date of Patent: Jul. 4, 2023

(54) INFORMATION MANAGEMENT SYSTEM, AND PORTABLE DEVICE AND IMAGE MANAGEMENT SERVER USED THEREIN

(71) Applicant: TOYOTA JIDOSHA KABUSHIKI KAISHA, Aichi-ken (JP)

(72) Inventors: Katsuhiko Iwazaki, Aichi-ken (JP); Yu Watanabe, Aichi-ken (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 45 days.

(21) Appl. No.: 17/469,806

(22) Filed: Sep. 8, 2021

(65) Prior Publication Data
US 2022/0078379 A1    Mar. 10, 2022

(30) Foreign Application Priority Data
Sep. 9, 2020    (JP) .................. 2020-151151

(51) Int. Cl.
*H04N 7/18* (2006.01)
*H04N 1/00* (2006.01)
*G06V 20/56* (2022.01)

(52) U.S. Cl.
CPC ............ *H04N 7/183* (2013.01); *G06V 20/56* (2022.01); *H04N 1/00209* (2013.01); *H04N 1/00244* (2013.01)

(58) Field of Classification Search
CPC ............... H04N 7/183; H04N 1/00209; H04N 1/00244; G06V 20/56
See application file for complete search history.

(56) References Cited

U.S. PATENT DOCUMENTS

2019/0012908 A1* 1/2019 Chun .................. G08G 1/0175

FOREIGN PATENT DOCUMENTS

JP    2019197525    * 11/2019
JP    2019197525 A    11/2019

* cited by examiner

*Primary Examiner* — Kathleen V Nguyen
(74) *Attorney, Agent, or Firm* — Hauptman Ham, LLP

(57) ABSTRACT

The in-vehicle device transfers the selected image selected by the user from the photographed images stored in the storage device and the selected vehicle state, which is the vehicle state when the selected image is captured, to the portable device. The portable device executes a portable side determination process for determining whether or not the selected image is a rare image by using the selected image and the selected vehicle state, and transmits the selected image determined to be a rare image by the portable side determination process and the selected vehicle state to the image management server only when the transmission is permitted by the user. The image management server stores the selected image and the selected vehicle state transmitted from the portable device in the image storage device.

14 Claims, 5 Drawing Sheets

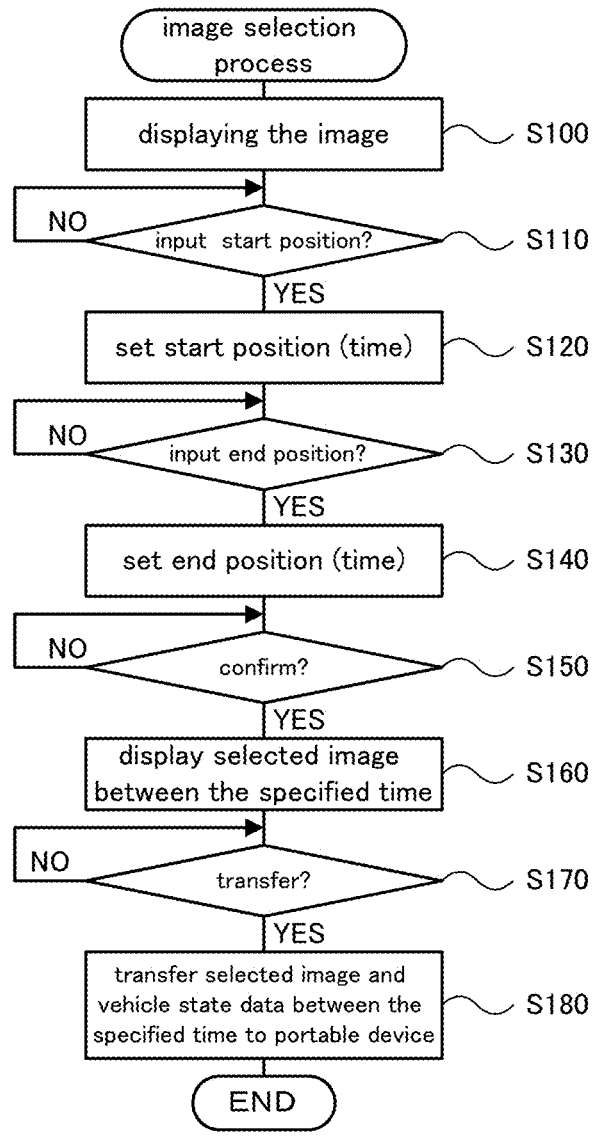

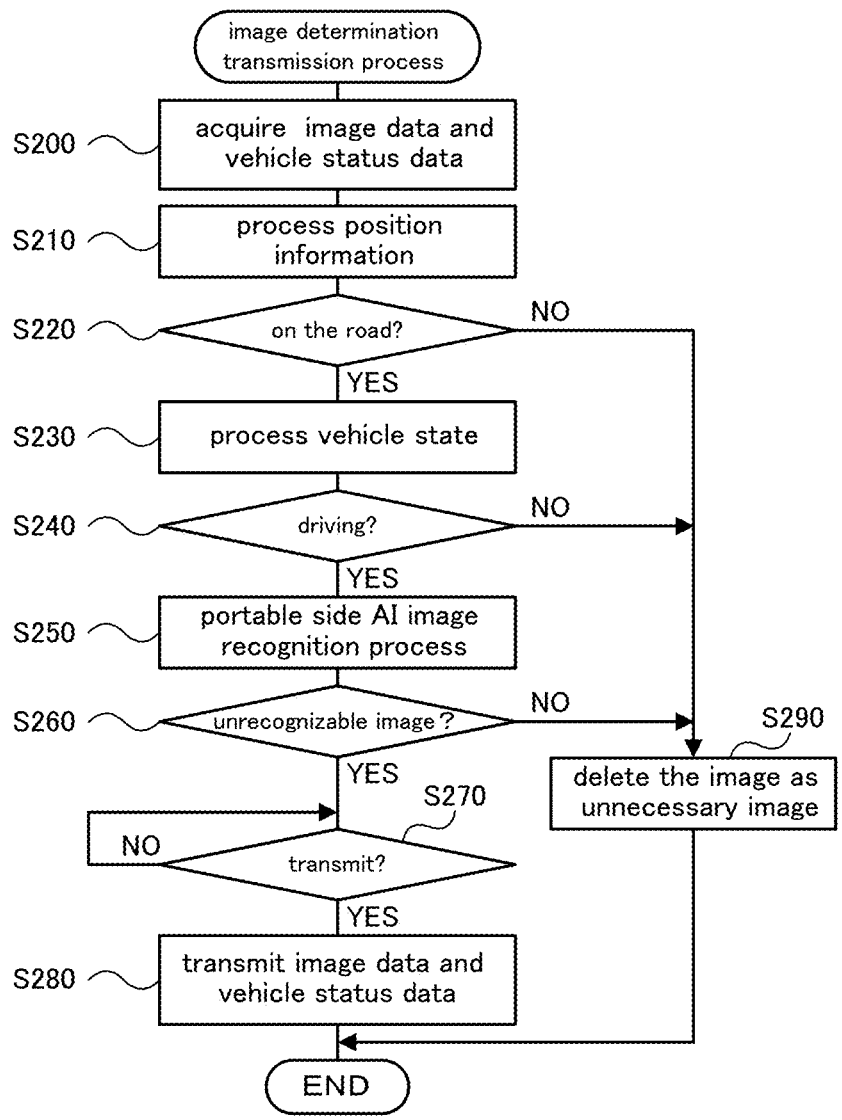

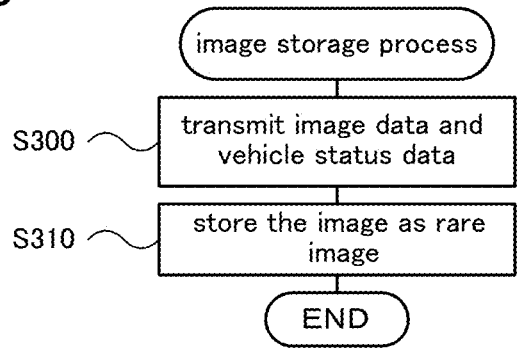
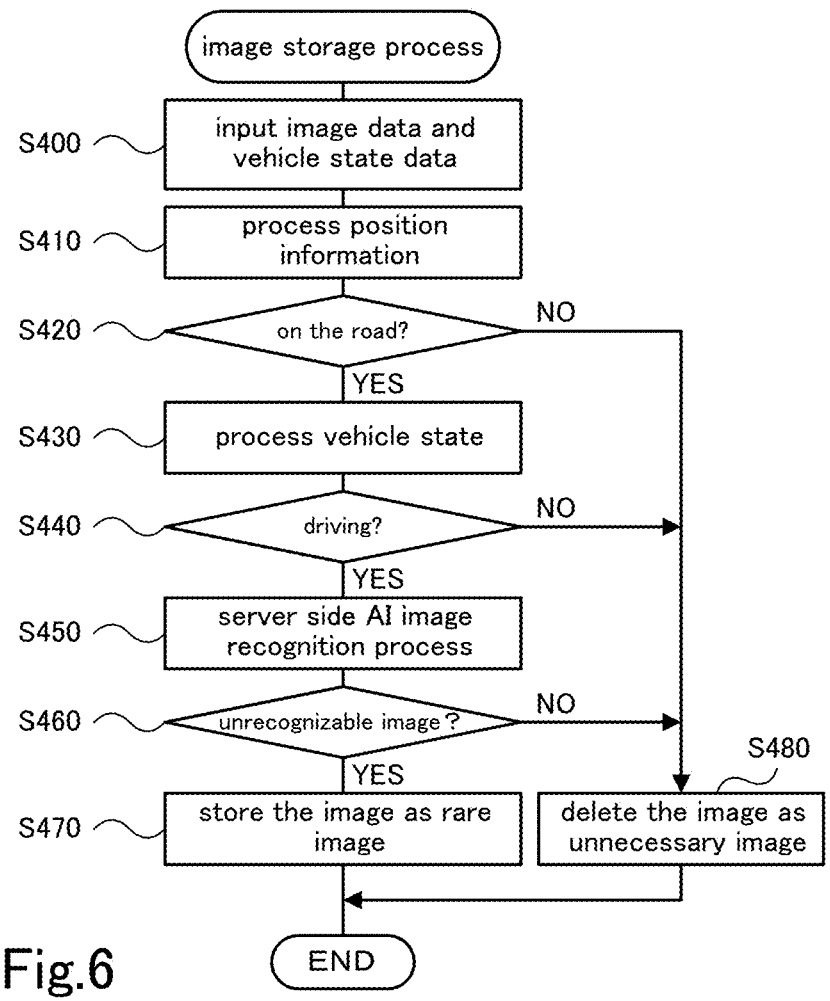

INFORMATION MANAGEMENT SYSTEM, AND PORTABLE DEVICE AND IMAGE MANAGEMENT SERVER USED THEREIN

CROSS-REFERENCE TO RELATED APPLICATIONS

The present disclosure claims priority to Japanese Patent Application No. 2020-151151 filed Sep. 9, 2020, which is incorporated herein by reference in its entirety including specification, drawings and claims.

TECHNICAL FIELD

The present invention relates to an information management system, and a portable device and an image management server used in the information management system.

BACKGROUND

Conventionally, as a system of this type, there has been proposed a system including an edge device mounted on a vehicle together with a drive recorder, a drive recorder information server connected to a plurality of edge devices via a communication network, and an external server connected to the communication network (for example, see patent literature 1). In this system, the edge device extracts the feature information of the image taken by the drive recorder and detects whether or not a predetermined event such as a traffic accident has occurred based on the feature information. Then, when the edge device detects a predetermined event has occurred, the edge device transmits the characteristic information of the image when the predetermined event has been detected to the drive recorder information server together with the information of the position and time at which the image was photographed. The drive recorder information server generates accident summary information indicating a summary of a traffic accident that has occurred based on the information acquired from the edge device, and provides the accident summary information to the external server. The external server provides traffic accident information to a number of drivers utilizing the server.

CITATION LIST

Patent Literature

PTL 1: JP2019-197525

SUMMARY

However, in the above-described system, feature information is extracted from an image photographed by the drive recorder, and when the feature information is extracted, the information of the image, the position, and the time is automatically transmitted to the drive recorder information server. Therefore, a large amount of images may be transmitted regardless of whether or not it is necessary. In this case, the amount of communication becomes excessive.

An information management system, and a portable device and an image management server used in the information management system according to the present disclosure having a main object of reducing a communication amount and a communication frequency of an image including a rare image between a user and the image management server.

The information management system, and the portable device and the image management server used in the information management system of the present disclosure adopt the following means in order to achieve the main object described above.

An information management system of the present disclosure including: an in-vehicle device including, a camera mounted on a vehicle, a sensor configured to detect a vehicle state, a storage device configured to store an image photographed by the camera and the vehicle state detected by the sensor, along with the time photographed, as the photographed image and the detected vehicle state, a transfer device configured to transfer the captured image and the detected vehicle state, and a control device configured to control the camera and the transfer device; a portable device configured to acquire and transmit the photographed image and the detected vehicle state transferred from the transfer device; and an image management server configured to receive the photographed image and the detected vehicle state transmitted from the portable device, wherein the control device of the in-vehicle device transfers a selected image selected by a user from the photographed images stored in the storage device and a selected vehicle state, which is a vehicle state when the selected image is photographed stored in the storage device to the portable device, wherein the portable device executes a portable side determination process for determining whether or not the selected image is a rare image by using the selected image and the selected vehicle state, and transmits the selected image and the selected vehicle state determined to be a rare image by the portable side determination process to the image management server only when the transmission is permitted by the user, wherein the image management server stores the selected image and the selected vehicle state received from the portable device in the image storage device.

In the information management system of the present disclosure, the in-vehicle device transfers the selected image selected by the user from the photographed image stored with time photographed by the camera and the detected vehicle state (selected vehicle state) when photographing the selected image to the portable device. Here, the vehicle state includes at least a vehicle speed, acceleration, yaw rate, wheel speed, gradient, vehicle position, shift position, accelerator opening, brake pedal position, and the like. The portable device executes a portable side determination process for determining whether or not the selected image is a rare image by using the selected image and the selected vehicle state, and transmits the selected image and the selected vehicle state determined to be a rare image by the portable side determination process to the image management server only when the transmission is permitted by the user. The image management server stores the selected image and the selected vehicle state received from the portable device in the image storage device. As described above, in the information management system of the present disclosure, the selected image selected by the user and the vehicle state (selected vehicle state) when the selected image is photographed are transferred to the portable device, and it is determined whether or not the selected image is a rare image by the portable side determination process using the selected image and the selected vehicle state at the portable device. Then, the selected image and the selected vehicle state are transmitted from the portable device to the image management server only when the selected image is determined to be a rare image by the portable side determination process and transmission is permitted by the user. For this reason, the communication volume and frequency of the moving image including the rare image between the user and the image management server can be reduced as compared with the case where the selected image automatically transmits the image that meets the predetermined conditions to the image management server. The "image" includes a still image and a moving image, and the same applies to the following description.

The portable device of the present disclosure is a portable device constituting the information management system of the present disclosure described above, that is the portable device of the present disclosure wherein the information management system comprising: an in-vehicle device including, a camera mounted on a vehicle, a sensor configured to detect a vehicle state, a storage device configured to store an image photographed by the camera and the vehicle state detected by the sensor, along with the time photographed, as the photographed image and the detected vehicle state, a transfer device configured to transfer the captured image and the detected vehicle state, and a control device configured to control the camera and the transfer device; the portable device configured to acquire and transmit the photographed image and the detected vehicle state transferred from the transfer device; and an image management server configured to receive the photographed image and the detected vehicle state transmitted from the portable device, wherein the control device of the in-vehicle device transfers a selected image selected by a user from the photographed images stored in the storage device and a selected vehicle state, which is a vehicle state when the selected image is photographed stored in the storage device to the portable device, wherein the image management server stores the selected image and the selected vehicle state received from the portable device in the image storage device, wherein the portable device configured to execute a portable side determination process for determining whether or not the selected image is a rare image by using the selected image and the selected vehicle state, and transmit the selected image and the selected vehicle state determined to be a rare image by the portable side determination process to the image management server only when the transmission is permitted by the user.

The portable device of the present disclosure is used in an information management system. In the information management system, the in-vehicle device transfers the selected image selected by the user from the photographed image stored with the time taken by the camera and the detected vehicle state (selected vehicle state) when photographing the selected image to the portable device. The portable device executes a portable side determination process for determining whether or not the selected image is a rare image by using the selected image and the selected vehicle state, and transmits the selected image determined to be a rare image by the portable side determination process and the selected vehicle state to the image management server only when the transmission is permitted by the user. The image management server stores the selected image and the selected vehicle state received from the portable device in the image storage device. As described above, in the information management system including the portable device of the present disclosure, the selected image selected by the user and the vehicle state when the selected image is photographed are transferred to the portable device, and the portable device determines whether or not the selected image is a rare image by the portable side determination process using the selected image and the selected vehicle state. Then, the selected image and the selected vehicle state are transmitted from the portable device to the image management server only when the selected image is determined to be a rare image by the portable side determination process and transmission is permitted by the user. For this reason, the communication volume and frequency of the moving image including the rare image between the user and the image management server can be reduced as compared with the case where the image that meets the predetermined conditions from the selected image is automatically transmitted to the image management server.

The image management server of the present disclosure is an image management server constituting the information management system of the present disclosure described above. That is the image management server used in an information management system, wherein the information management system comprising: an in-vehicle device including, a camera mounted on a vehicle, a sensor configured to detect a vehicle state, a storage device configured to store an image photographed by the camera and the vehicle state detected by the sensor, along with the time photographed, as the photographed image and the detected vehicle state, a transfer device configured to transfer the captured image and the detected vehicle state, and a control device configured to control the camera and the transfer device; a portable device configured to acquire and transmit the photographed image and the detected vehicle state transferred from the transfer device; and the image management server configured to receive the photographed image and the detected vehicle state transmitted from the portable device, wherein the control device of the in-vehicle device transfers a selected image selected by a user from the photographed images stored in the storage device and a selected vehicle state, which is a vehicle state when the selected image is photographed stored in the storage device to the portable device, wherein the portable device executes a portable side determination process for determining whether or not the selected image is a rare image by using the selected image and the selected vehicle state, and transmits the selected image and the selected vehicle state determined to be a rare image by the portable side determination process to the image management server only when the transmission is permitted by the user, wherein the image management server stores the selected image and the selected vehicle state received from the portable device in the image storage device, wherein the image management server further configured to execute server side determination process for determining whether or not the selected image is a rare image using the selected image and the selected vehicle state received from the portable device, and store the selected image determined to be a rare image by executing the server side determination process in the image storage device.

The image management server of the present disclosure is used in an information management system. In the information management system, the in-vehicle device transfers the selected image selected by the user from the photographed image stored with the time taken by the camera and the detected vehicle state (selected vehicle state) when photographing the selected image to the portable device. The portable device executes a portable side determination process for determining whether or not the selected image is a rare image by using the selected image and the selected vehicle state, and transmits the selected image determined to be a rare image by the portable side determination process and the selected vehicle state to the image management server only when the transmission is permitted by the user. The image management server determines whether or not the selected image is a rare image using the selected image received from the portable device and the selected vehicle state, and stores the selected image when the selected image is determined to be a rare image. As described above, in the information management system including the image management server of the present disclosure, the selected image selected by the user and the vehicle state when the selected image is photographed are transferred to the portable device, and the portable device determines whether or not the selected image is a rare image by the portable side determination process using the selected image and the selected vehicle state. Then, the selected image and the selected vehicle state are transmitted from the portable device to the image management server only when the selected image is determined to be a rare image by the portable side determination process and transmission is permitted by the user. For this reason, the communication volume and frequency of the moving image including the rare image between the user and the image management server can be reduced as compared with the case where the image that meets the predetermined conditions from the selected image is automatically transmitted to the image management server. The image management server determines whether or not the selected image is a rare image by the server side determination process on the selected image selected and permitted by the user and transmitted from the portable device. This enables to impose a sufficient process for the determination as a rare image. As a result, it enables to more appropriately determine and accumulate the rare image.

BRIEF DESCRIPTION OF DRAWINGS

FIG. 3 is a flowchart showing an example of an image selection process performed by the electronic control unit 30 of the in-vehicle device 20 when the user selects an image;

FIG. 4 is a flowchart showing an example of an image determination transmission process executed by the portable device 120;

FIG. 5 is a flowchart showing an example of an image storage process executed by the image management server 230 of the information management center 220; and FIG. 6 is a flowchart showing a modified example of an image storage process.

DETAILED DESCRIPTION OF EMBODIMENTS

The following describes some aspects of the present disclosure with reference to an embodiment.

Figure 1:
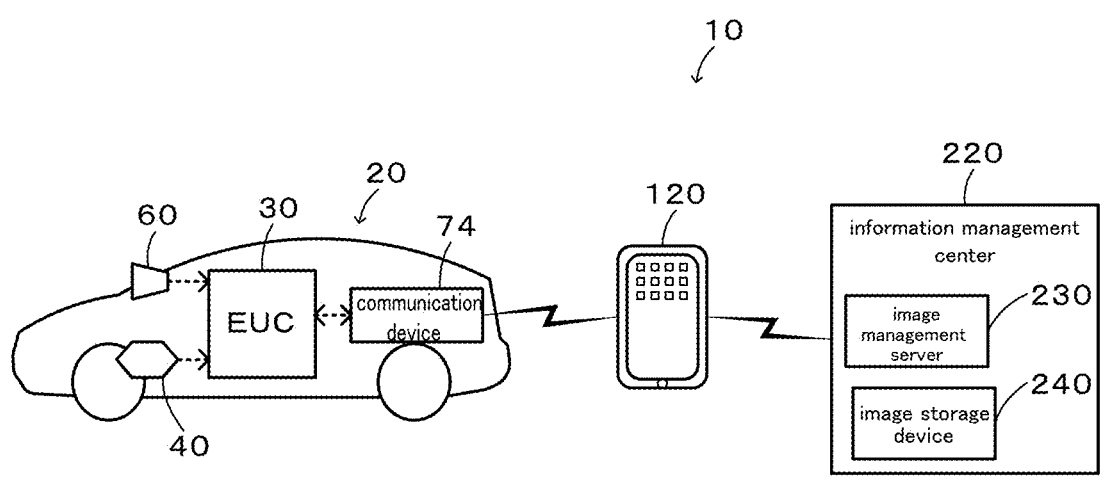
FIG. 1 is a configuration diagram showing an outline of a configuration of an information management system 10 according to an embodiment of the present disclosure.
Figure 2:
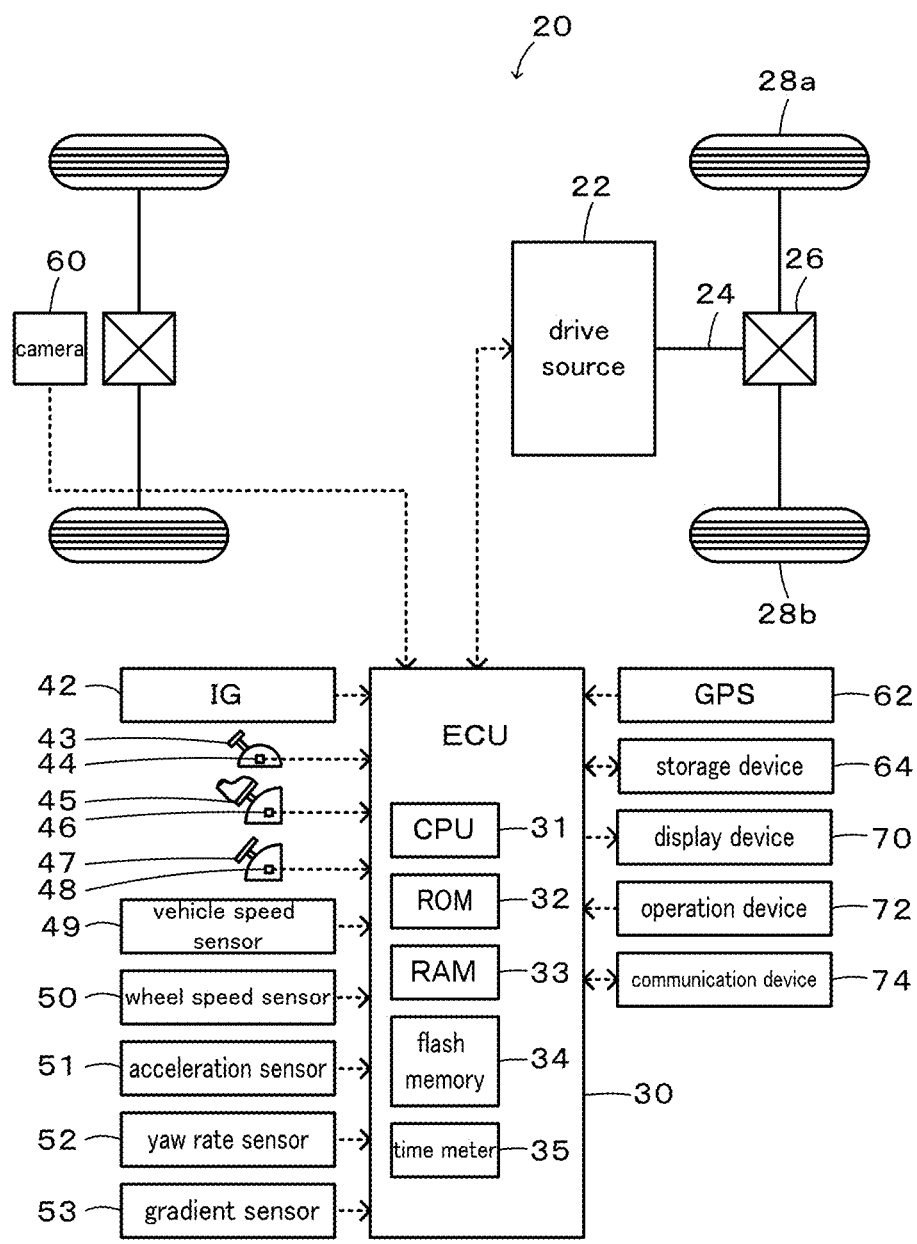
FIG. 2 is a configuration diagram showing a schematic of a configuration of an in-vehicle device 20 provided with the information management system 10 of the embodiment.

FIG. 1 is a configuration diagram showing an outline of a configuration of an information management system 10 as an embodiment of the present invention, and FIG. 2 is a configuration diagram showing an outline of a configuration of an in-vehicle device 20 included in the information management system 10 of the embodiment. As shown, the information management system 10 of the embodiment includes an in-vehicle device 20 which is mounted, a portable device 120, and an image management center 220.

As shown in FIG. 2, the in-vehicle device 20 is mounted on a vehicle that travels by transmitting the driving force outputted from the drive source 22 to the driveshaft 24 to the drive wheels 28a and 28b via the differential gear 26. The drive source 22 may include an engine transmission system including an engine driven by using a hydrocarbon-based fuel such as gasoline or diesel oil and an automatic transmission, a hybrid system including an engine and a motor and a storage battery, an electric vehicle system including a motor and a storage battery, and a fuel cell system including a motor and a storage battery and a fuel cell.

The in-vehicle device 20 includes a camera 60, various sensors 40, a storage device 64, a display device 70, an operation device 72, a communication device 74, and an electronic control unit 30.

The camera 60 is disposed in front of the vehicle. A camera, for example, incorporated in the drive recorder storing vehicle speed, GPS (Global Positioning System) data, time, and photographed images may be used as the camera 60. The camera 60 may be disposed not only in front of the vehicle but also in the rear and lateral direction of the vehicle.

Various sensors 40 may include sensors detecting the status of a vehicle such as a vehicle speed sensor 49, a wheel speed sensor 50, an acceleration sensor 51, a yaw rate sensor 52, a gradient sensor 53, and a GPS (Global Positioning System) 62.

The storage device 64 is configured by, for example, a hard disk drive or an SSD (Solid State Drive. A storage device incorporated in a drive recorder or provided separately from a drive recorder may be used as the storage device 64.

Display device 70 is configured as, for example, a liquid crystal display. A display device incorporated in the drive recorder or provided separately from the drive recorder may be used as the display 70.

The operation device 72 includes switches used for displaying an image (including a moving image) stored in the storage device 64 on the display device 70 or editing an image (including a moving image) displayed on the display device 70. An operation device incorporated in a drive recorder or provided separately from a drive recorder may be used as the operation device 72.

The communication device 74 has a function of transferring an image (including a moving image) to the portable device 120 by wire or wireless (for example, a Bluetooth® function). A communication device incorporated in a drive recorder or provided separately from a drive recorder may be used as the communication device 74.

The electronic control unit 30 is a microcomputer configured around a CPU31. In addition to CPU31, the electronic control unit 30 includes a ROM32 for storing a program or the like, a RAM32 for temporarily storing data, a flash memory 34 for storing data or the like, a time meter 35 having a timer function or the like, an input/output port (not shown). The electronic control unit 30 may be incorporated into the drive recorder or provided separately from the drive recorder. Further, in the electronic control unit 30, the unit performing driving control of the vehicle and the unit editing, storing, and transferring the images photographed by the camera 60 may be separate.

The signals from the various sensors are input via the input port to the electronic control unit 30. The signals input to the electronic control unit 30 via the input port may include an ignition signal from the ignition switch 42, a shift position from the shift position sensor 44 for detecting the position of the shift lever 43, an accelerator opening degree from the accelerator pedal position sensor 46 for detecting the amount of depression of the accelerator pedal 45, and a brake position from the brake pedal position sensor 48 for detecting the amount of depression of the brake pedal 47. Further, the signals input to the electronic control unit 30 via the input port may include the vehicle speed from the vehicle speed sensor 49, the wheel speed from the wheel speed sensor 50, the acceleration from the acceleration sensor 51, the yaw rate from the yaw rate sensor 52, the road surface gradient from the gradient sensor 53, GPS data (position information) from GPS62, and the like. Furthermore, the operation signals of the switches of the operation device 72, various signals indicating the state of the drive source 22 from the drive source 22 can also be mentioned as the signals input to the electronic control unit 30 via the input port.

The electronic control unit 30 outputs various control signals via the output port. Examples of the control signal output from the electronic control unit 30 via the output port may include a control signal for storing an image (including a moving image) photographed by the camera 40 with the time taken in the storage device 64, a control signal for storing a signal indicating the state of the vehicle detected by various sensors together with the time in the storage device 64, a transfer control signal for outputting the image (including a moving image) to the communication device 74 when the image is transferred to the portable device 120, and the like.

The portable device 120 is configured as a smartphone having, for example, a function of a microcomputer and a telephone. The application software for acquiring an image transferred from the in-vehicle device 20 by wire or wireless and communicating with the information management center 220 via a communication network such as the Internet or a telephone line is installed win the portable device 120.

The information management center 220 includes an image management server 230, an image storage device 240, and a communication device 250. The image management server 230 is composed of a general-purpose microcomputer, and includes a program for communicating with the portable device 120 and a program for evaluating an image acquired by communicating with the portable device 120. The image storage device 240 is composed of, for example, a hard disk drive or an SSD (Solid State Drive).

In the vehicle device 20 in the information management system 10 of the embodiment, regardless of whether the ignition switch 42 is turned on or off, an image photographed by the camera 60 is always stored in the storage device 64 together with the time taken by camera. In the in-vehicle device 20, the vehicle state detected by the various sensors 40 is also stored in the storage device 64 together with the detection time regardless of whether the ignition switch 42 is turned on or off. The vehicle status includes at least a portion of, for example, a vehicle speed from the vehicle speed sensor 49, a wheel speed from the wheel speed sensor 50, an acceleration from the acceleration sensor 51, a yaw rate from the yaw rate sensor 52, a road surface gradient from the gradient sensor 53, GPS data (position information) from GPS62, and the like. The photographing by the camera 60 and the detection of the vehicle state by the various sensors 40 may be limited to when the ignition switch 42 is turned on.

Next, an operation of the information management system 10 according to the embodiment configured as described above will be described. The user operates the switches of the operation device 74 of the in-vehicle device 20 to display an image (including a still image and a moving image; hereinafter, the same) stored in the storage device 64 on the display device 72, and selects a range of images to be transmitted to the information management center 220. FIG. 3 is a flowchart showing an example of image selection process executed by the electronic control unit 30 of the in-vehicle device 20 when the user selects the image to be transmitted to the information management center 220.

When the image selection process is executed, the electronic control unit 30 starts displaying the image stored in the storage device 64 on the display device 72 (step S100). Next, the electronic control unit 30 waits for the start position (time) of the image to be transferred to the information management center 220 to be input (step S110), the input position (time) is set as the start position (time) (step S120). Specifically, when the user operates the fast-forward switch or the return switch of the operation device 74 and the start position of the image (moving image) to be transferred to the information management center 220 is input, the position is set as the start position (start time). Next, the electronic control unit 30 waits for the end position (time) of the image to be input (step S130), the input position is set as the end position (time) (step S140). Similarly, when the user operates the fast-forward switch or the return switch of the operation device 74 and the end position of the image is input, the position is set as the end position. Hereinafter, an image from the start position (start time) to the end position (end time) will be referred to as a selected image.

Next, the electronic control unit 30 waits for the user to operate "confirm" on the selected images (step S150). When "Confirm" is operated by the user, the electronic control unit 30 displays the selected image on the display device 72 (S160 of steps) and lets the user to confirm the selected image. The confirmation process of the selected images in S150, S160 is optional, and the following processing may be performed without the confirmation processing.

Subsequently, the portable device 120 and the in-vehicle device 20 is wired or wirelessly connected by the user, the electronic control unit 30 activates the application software for acquiring an image transferred from the in-vehicle device 20 of the portable device 120 and communicating with the information management center 220, and waiting for "transfer" is operated for the selected image (step S170). When the "transfer" is operated by the user, the electronic control unit 30 transfers the image data of the selected image and the vehicle state data (vehicle state data with time; hereinafter referred to simply as "vehicle state data") detected by the various sensors 40 when the selected image is photographed to the portable device 120 (step S180), and ends the image selection process. It should be noted that the transfer process of steps S170 and S180 is also optional, and the image selection process may be terminated without the user operating "transfer". In this case, the process ends without transferring the selected image.

Next, an operation of the portable device 120 that has received the transfer of the selected image will be described. FIG. 4 is a flowchart showing an example of image determination transmission process executed by the portable device 120. This process is executed when the portable device 120 and the in-vehicle device 20 are connected by wire or wireless, and application software for acquiring an image transferred from the in-vehicle device 20 of the portable device 120 or communicating with the information management center 220 is activated.

When the image determination transmission process is executed, the portable device 120 first acquires the image data of the selected image and the vehicle status data transferred from the in-vehicle device 20 (step S200). That is, while the step S200 is being executed, the steps S170 and S180 of the image selection process of FIG. 3 is executed, whereby the image data of the selected image and the vehicle status data are transferred from the in-vehicle device 20 and acquired by the portable device 120. In the subsequent process, whether or not the portable device 120 is connected to the in-vehicle device 20 by wired or wireless connection does not matter.

Subsequently, the portable device 120 determines whether or not the photographing position of the selected image is on the road based on the GPS data (position information) included in the image data of the selected image or the vehicle state data (step S210, S220). For example, it can be determined whether it is on a road or not by using GPS data to a map. When it is determined that the photographing position of the selected image is not on the roads, it is determined that the selected image does not correspond to the rare image and is an unnecessary image, the image data of the selected image and the vehicle-state data are deleted (step S290), and the image determination transmission process is terminated.

When it is determined in the step S220 that the photographing position of the selected image is on the road, the portable device 120 determines whether or not the photographing of the selected image has been performed while driving on the road based on the selected vehicle state (step S230, S240). For example, it is possible to determine whether or not the vehicle is traveling based on whether or not the vehicle speed is equal to or higher than a threshold value, such as 3 km/h or 5 km/h. When the portable device 120 determines that the photographing of the selected image is not performed while the vehicle is traveling, it is determined that the selected image does not correspond to the rare image and is an unnecessary image, the image data of the selected image and the vehicle-state data are deleted (step S290), and the image determination transmission process is terminated.

When the portable device 120 determines that the photographing of the selected image is being performed during the driving in step S240, the portable side AI image recognition process is performed on the selected image (step S250), and it is determined whether or not an object or an event in the selected image has been recognized (step S260). In the embodiment, the portable side AI image recognition process is downloaded one adjusted by using the server-side AI image recognition process updated at a predetermined timing by the image management server 230. In the embodiment, as the server side AI image recognition process, the process is used in which an object or an event in each image is machine-learned by providing a solution to an object or an event in each image with respect to a large number of images that are determined to be a rare image and stored in the image storage device 240, and an object or an event in the selected image is recognized using the learned model obtained by the machine learning process. This machine learning is repeatedly performed at a timing at which a selected image as a rare image is accumulated in the image accumulating device 240, at a timing every predetermined period, or at a desired timing, and the AI image recognition process is updated. In the embodiment, the portable side AI image recognition process is adjusted using the server side AI image recognition process, which is downloaded and installed in the portable device 120. Therefore, in the processing of the steps S250 and S260, when the portable device 120 determines that an object or an event of the selected image can be recognized by the portable side AI image recognition process, it can be determined that the selected image is not a rare image. In this case, the selected image is determined as an unnecessary image, the image data of the selected image and the vehicle-state data are deleted (step S290), and the image determination transmission process is terminated.

When it is determined that the object or event of the selected image cannot be recognized by the portable side AI image recognition process in the steps S250 and S260, it is determined that the selected image is a rare image. Then, the portable device 120 waits for "transmission" to be operated on the selected image by the user (step S270). When "transmission" is operated by the user, the image data of the selected image and the vehicle-state data are transmitted to the information management center 20 (step S280), and the image determination transmission process is terminated.

FIG. 5 is a flowchart showing an example of image storage process executed by the image management server 230 of the information management center 220. When the image data of the selected image and the vehicle state data are transmitted from the portable device 120, the image management server 230 of the information management center 220 receives the image data of the selected image and the vehicle state data (step S300), stores the selected image as a rare image in the image storage device 240 (step S310), and ends the image storage process. Since the selected image is determined to be a rare image by the portable side AI image recognition process in the image determination transmission process of the portable device 120, the image management server stores the selected image in the image storage device 240 as a rare image without performing the rare determination process on the selected image.

In the information management system 10 of the embodiment described above, the in-vehicle device 20 transfers the selected image selected by the user from the photographed image stored with time photographed by the camera 60 and the detected vehicle state (selected vehicle state) when photographing the selected image to the portable device 120. The portable device 120 executes portable side AI image recognition process for determining whether the selected image is a rare image using the image data of the selected image and the vehicle state data, and transmits the image data of the selected image determined to be a rare image by the portable side AI image recognition process and the vehicle state data to the image management server 230 only when transmission of the selected image and the vehicle state data are permitted by the user. Upon receiving the image data of the selected image and the vehicle state data transmitted from the portable device 120, the image management server 230 stores the selected image in the image storage device 240 as a rare image. As described above, in the information management system 10 of the embodiment, the portable device 120 determines whether or not the selected image is a rare image by the portable side AI image recognition process using the image data of the selected image and the vehicle state data, and transmits the image data of the selected image and the vehicle state data to the image management server 230 only when the selected image is determined to be a rare image and when the transmission is permitted by the user. For this reason, the communication volume and frequency of the moving image including the rare image between the user and the image management server can be reduced as compared with the case where the selected image automatically transmits the image that meets the predetermined conditions to the image management server.

In the portable device 120 of the information management system 10 of the embodiment, when the selected image is not photographed while driving on the road, the determination of the rare image by the portable side AI image recognition process is not performed. However, the determination of the rare image may be performed by the portable side AI image recognition process: if the selected image is photographed on the road even if it is not driving; if the selected image is photographed while driving even if it is not on the road; or regardless of whether it is on the road or driving.

In the portable device 120 of the information management system 10 of the embodiment, when the selected image is not photographed while driving on the road, the determination of the rare image by the portable side AI image recognition process is not performed. However, the rare image may be determined by the portable side AI image recognition process when the selected image is photographed on the road, while driving, and under the predetermined condition below. For example, the predetermined condition is: a state in which the acceleration is equal to or greater than the first reference value or less than the second threshold value; a state in which the yaw rate is equal to or greater than the third threshold value or less than the fourth threshold value; or a state in which the road surface gradient is equal to or greater than the fifth threshold value or less than the sixth threshold value.

In the portable device 120 of the information management system 10 of the exemplary embodiment, as the portable side AI image recognition process, the portable side AI image recognition process adjusted using the server side AI image recognition process updated at a predetermined timing by the image management server 230 is downloaded and installed. However, the server side AI image recognition process may not be used as long as it is adjusted by using the result of machine learning (learned model) at a predetermined timing based on the rare image stored in the image recognition device 240.

In the information management system 10 of the embodiment, when the image data of the selected image and the vehicle state data transmitted from the portable device 120 are received, the image management server 230 stores the selected image in the image storage device 240 as a rare image. However, the image management server 230 may perform rare image determination. In this case, the image storage process of FIG. 6 may be performed instead of the image storage process of FIG. 5.

In the image storage process of FIG. 6, upon receiving the image data of the selected image and the vehicle state data (step S400), the image managing server 230 determines whether or not the selected image is photographed while driving on the roads based on the image data of the selected image or the vehicle state data (step S410~S440) in the same manner as steps S210~S240 in the image determination transmission process of FIG. 4 described above. When it is determined that the photographing position of the selected image is not on the roads, or when it is determined that the photographing of the selected image is not performed while the vehicle is driving, it is determined that the selected image does not correspond to the rare image and is an unnecessary image, the image data of the selected image and the vehicle-state data are deleted (step S480), and the image storage process is terminated. When it is determined in step S410~S440 that the selected image is photographed while driving on the roads, the server side AI image recognition process is performed on the selected image (step S450), and it is determined whether or not an object or an event in the selected image has been recognized (step S460). Server side AI image recognition process was described above. When it is determined that the object or event of the selected image cannot be recognized by the server side AI image recognition process, the selected image is determined to be a rare image, the selected image is stored in the image storage device 240 (step S470), and the image storage process is terminated. On the other hand, when it is determined that the object or event of the selected image can be recognized by the server side AI image recognition process, it is determined that the selected image is not a rare image but an unnecessary image, the image data of the selected image and the vehicle-state data are deleted (step S480), and the image storage process is terminated.

By such image storage process, it enables to store only rare image from the selected image, which is photographed while driving on the road and an object or an event of the image cannot be recognized by the server-side AI image recognition process, transmitted from the portable device 120 in the image storage device 240. The rare image stored in the image storage device 240 is not only used in the above-described server side and portable side AI image recognition process, but also used for image recognition process in automatic operation, analysis of an accident, accident information, and the like when the rare image is an accident image. If the image storage process of FIG. 6 is performed by the image management server 230 in this manner, it enables to more appropriately determine and store the rare image.

In the image management server 230 of modified example, when the selected image is not photographed while driving on the road, the rare image is not determined by the server side AI image recognition process. However, the determination of the rare image may be performed by the server side AI image recognition process: if the selected image is photographed on the road even if it is not driving; if the selected image is photographed while driving even if it is not on the road; or regardless of whether it is on the road or driving.

In the image management server 230 of the modified example, when the rare image is not photographed while driving on the road, the rare image is not determined by the server side AI image recognition process. However, the rare image may be determined by the server side AI image recognition process when the selected image is photographed on the road, while driving, and under the predetermined condition below. For example, the predetermined condition is: a state in which the acceleration is equal to or greater than the first reference value or less than the second threshold value; a state in which the yaw rate is equal to or greater than the third threshold value or less than the fourth threshold value; or a state in which the road surface gradient is equal to or greater than the fifth threshold value or less than the sixth threshold value.

In the embodiment, the present disclosure has been described as a form of the information management system 10, but it may be a form of the in-vehicle device 20 provided in the information management system 10, a form of the portable device 120 provided in the information management system 10, or a form of the image management server 230 provided in the information management system 10.

In the information management system of the present disclosure, the portable side determination process may be a process of determining whether or not the selected image is a rare image by evaluating the selected image based on a past image stored in the image storage device. Past images stored in the image storage device can be used. In this case, the portable side determination process may be a process of determining that the selected image is a rare image when the object or event in the selected image cannot be recognized based on a result of learning about the object or event in the past image stored in the image storage device. That is, whether the selected image is a rare image may be determined on the basis of whether the object or event in the selected image can be recognized by the artificial intelligence image recognition process constructed by image recognition of the object or event in the past image stored in the image storage device. In these cases, the portable side determination process may be a process of determining whether or not the selected image is a rare image when the selected image is an image photographed while driving on a road based on the selected vehicle state. In this way, it can be limited to images photographed when the vehicle is traveling on the road.

In the information management system of the present disclosure, the image management server may execute server side determination process for determining whether or not the selected image is a rare image using the selected image and the selected vehicle state received from the portable device, and may store the selected image determined to be a rare image by executing the server side determination process in the image storage device. In this way, the image management server determines whether or not the selected image is a rare image for the selected image selected and permitted by the user and transmitted from the portable device, so that a step sufficient for determining a rare image can be imposed. As a result, it enables to more appropriately determine and accumulate the rare image. In this case, the server side determination process may be a process of determining that the selected image is a rare image when the object or event cannot be recognized based on the result of learning on the object or event in the past image stored in the image storage device, and may be a process of performing the learning at a predetermined timing, and the portable side determination process may be a process of using the result of learning at a specific past timing. In this case, the portable side determination process can be performed using the server side determination process, and a more appropriately selected image and the selected vehicle state can be transmitted from the portable device to the image management server. Further, in this case, the server side determination process may be a process of determining whether or not the selected image is a rare image when the selected image is an image photographed while driving on a road based on the selected vehicle state. In this way, it can be limited to images photographed when the vehicle is driving on the road.

In the portable device of the present disclosure, the portable side determination process may be a process of determining whether or not the selected image is a rare image by evaluating the selected image based on a past image stored in the image storage device. This enables to use the past image stored in the image storage device. In this case, the portable side determination process may be a process of determining that the selected image is a rare image when the object or event in the selected image cannot be recognized based on a result of learning about the object or event in the past image stored in the image storage device. That is, whether the selected image is a rare image may be determined on the basis of whether the object or event in the selected image can be recognized by the artificial intelligence image recognition process constructed by image recognition of the object or event in the past image stored in the image storage device. In these cases, the portable side determination process may be a process of determining whether or not the selected image is a rare image when the selected image is an image photographed while driving on a road based on the selected vehicle state. In this way, it can be limited to images photographed when the vehicle is driving on the road.

In the image management server of the present disclosure, the server side determination process may be a process, in which a predetermined determination process for determining whether or not the selected image is a rare moving image by evaluating the selected image based on a past moving image stored in the image storage device, updated at a predetermined timing, and the portable side determination process may be a process in which the determination accuracy of at least a part of the server side determination process or the server side determination process updated at a specific past timing is lowered. In this way, the image management server determines whether or not the selected image is a rare image for the selected image selected and permitted by the user and transmitted from the portable device, so that a step sufficient for determining a rare image can be imposed. As a result, it enables to more appropriately determine and accumulate the rare image.

In the image management server of the present disclosure, the server side determination process may be a process for determining that an object or an event in the selected image is a rare image when it cannot be recognized based on a result of learning on an object or an event in a past image stored in the image storage device, and the learning is performed at a predetermined timing, and the portable side determination process may be a process using a result of performing the learning at a specific timing in the past. In this case, the portable side determination process can be performed using the server side determination process, and a more appropriately selected image and the selected vehicle state can be transmitted from the portable device to the image management server. Further, in this case, the server side determination process may be a process of determining whether or not the selected image is a rare image when the selected image is an image photographed while driving on a road based on the selected vehicle state. In this way, it can be limited to images photographed when the vehicle is driving on the road.

The following describes the correspondence relationship between the primary components of the embodiment and the primary components of the disclosure described in Summary. In the embodiment, the camera 60 corresponds to a camera, various sensors 40 corresponds to a sensor, the storage device 64 corresponds to a storage device, the communication device 74 corresponds to a transfer device, the electronic control unit 30 corresponds to a control device, the in-vehicle device 20 corresponds to an in-vehicle device. The portable device 120 corresponds to a "portable device", the image management server 230 corresponds to an "image management server", and the image storage device 240 corresponds to an "image storage device".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The present invention can be applied to the manufacturing industry of an information management system and a portable device and an image management server used for the information management system.

The invention claimed is:

1. An information management system, comprising:
an in-vehicle device including, a camera mounted on a vehicle, a sensor configured to detect a vehicle state, a storage device configured to store an image photographed by the camera and the vehicle state detected by the sensor, along with the time photographed, as the photographed image and the detected vehicle state, a transfer device configured to transfer the captured image and the detected vehicle state, and a control device configured to control the camera and the transfer device;
a portable device configured to acquire and transmit the photographed image and the detected vehicle state transferred from the transfer device; and
an image management server configured to receive the photographed image and the detected vehicle state transmitted from the portable device,
wherein the control device of the in-vehicle device transfers a selected image selected by a user from the photographed images stored in the storage device and a selected vehicle state, which is a vehicle state when the selected image is photographed stored in the storage device to the portable device,
wherein the portable device executes a portable side determination process for determining whether or not the selected image is a rare image by using the selected image and the selected vehicle state, and transmits the selected image and the selected vehicle state determined to be a rare image by the portable side determination process to the image management server only when the transmission is permitted by the user,
wherein the image management server stores the selected image and the selected vehicle state received from the portable device in the image storage device.

2. The information management system according to claim 1, wherein the portable side determination process determines whether or not the selected image is a rare image by evaluating the selected image based on a past image stored in the image storage device.

3. The information management system according to claim 2, wherein the portable side determination process determines that the selected image is a rare image when an object or event in the selected image cannot be recognized based on a result of learning about the object or event in the past image stored in the image storage device.

4. The information management system according to claim 2, wherein the portable side determination process determines whether or not the selected image is a rare image when the selected image is an image photographed while driving on a road based on the selected vehicle state.

5. The information management system according to claim 1, wherein the image management server executes server side determination process for determining whether or not the selected image is a rare image using the selected image and the selected vehicle state received from the portable device, and stores the selected image determined to be a rare image by executing the server side determination process in the image storage device.

6. The information management system according to claim 5, wherein the server side determination process determines that the selected image is a rare image when the object or event cannot be recognized based on the result of learning on the object or event in the past image stored in the image storage device, and is a process of performing the learning at a predetermined timing, and the portable side determination process is a process of using the result of learning at a specific past timing.

7. The information management system according to claim 6, wherein the server side determination process determines whether or not the selected image is a rare image when the selected image is an image photographed while driving on a road based on the selected vehicle state.

8. A portable device used in an information management system, wherein the information management system comprising:
an in-vehicle device including, a camera mounted on a vehicle, a sensor configured to detect a vehicle state, a storage device configured to store an image photographed by the camera and the vehicle state detected by the sensor, along with the time photographed, as the photographed image and the detected vehicle state, a transfer device configured to transfer the captured image and the detected vehicle state, and a control device configured to control the camera and the transfer device;
the portable device configured to acquire and transmit the photographed image and the detected vehicle state transferred from the transfer device; and
an image management server configured to receive the photographed image and the detected vehicle state transmitted from the portable device,
wherein the control device of the in-vehicle device transfers a selected image selected by a user from the photographed images stored in the storage device and a selected vehicle state, which is a vehicle state when the selected image is photographed stored in the storage device to the portable device,
wherein the image management server stores the selected image and the selected vehicle state received from the portable device in the image storage device;
wherein the portable device configured to execute a portable side determination process for determining whether or not the selected image is a rare image by using the selected image and the selected vehicle state, and transmit the selected image and the selected vehicle state determined to be a rare image by the portable side determination process to the image management server only when the transmission is permitted by the user.

9. The portable device according to claim 8, wherein the portable side determination process determines whether or not the selected image is a rare image by evaluating the selected image based on a past image stored in the image storage device.

10. The portable device according to claim 9, wherein the portable side determination process determines that the selected image is a rare image when an object or event in the selected image cannot be recognized based on a result of learning about the object or event in the past image stored in the image storage device.

11. The information management system according to claim 9, wherein the portable side determination process determines whether or not the selected image is a rare image when the selected image is an image photographed while driving on a road based on the selected vehicle state.

12. An image management server used in an information management system, wherein the information management system comprising:
- an in-vehicle device including, a camera mounted on a vehicle, a sensor configured to detect a vehicle state, a storage device configured to store an image photographed by the camera and the vehicle state detected by the sensor, along with the time photographed, as the photographed image and the detected vehicle state, a transfer device configured to transfer the captured image and the detected vehicle state, and a control device configured to control the camera and the transfer device;
- a portable device configured to acquire and transmit the photographed image and the detected vehicle state transferred from the transfer device; and
- the image management server configured to receive the photographed image and the detected vehicle state transmitted from the portable device,
- wherein the control device of the in-vehicle device transfers a selected image selected by a user from the photographed images stored in the storage device and a selected vehicle state, which is a vehicle state when the selected image is photographed stored in the storage device to the portable device,
- wherein the portable device executes a portable side determination process for determining whether or not the selected image is a rare image by using the selected image and the selected vehicle state, and transmits the selected image and the selected vehicle state determined to be a rare image by the portable side determination process to the image management server only when the transmission is permitted by the user,
- wherein the image management server stores the selected image and the selected vehicle state received from the portable device in the image storage device,
- wherein the image management server further configured to execute server side determination process for determining whether or not the selected image is a rare image using the selected image and the selected vehicle state received from the portable device, and store the selected image determined to be a rare image by executing the server side determination process in the image storage device.

13. The image management server according to claim 12, wherein the server side determination process determines that the selected image is a rare image when the object or event cannot be recognized based on the result of learning on the object or event in the past image stored in the image storage device, and is a process of performing the learning at a predetermined timing, and the portable side determination process is a process of using the result of learning at a specific past timing.

14. The image management server of claim 13, wherein the server side determination process determines whether or not the selected image is a rare image when the selected image is an image photographed while driving on a road based on the selected vehicle state.

* * * * *